United States Patent [19]

Chraplyvy et al.

[11] Patent Number: 5,420,868
[45] Date of Patent: May 30, 1995

[54] SUPPRESSION OF BRILLOUIN SCATTERING IN LIGHTWAVE TRANSMISSION SYSTEM

[75] Inventors: Andrew R. Chraplyvy, Matawan, N.J.; Xiaoping Mao, State College, Pa.; Robert W. Tkach, Little Silver, N.J.

[73] Assignee: AT&T Corp., Murray Hill, N.J.

[21] Appl. No.: 326,307

[22] Filed: Oct. 20, 1994

Related U.S. Application Data

[63] Continuation of Ser. No. 924,690, Jul. 31, 1992, abandoned.

[51] Int. Cl.$^6$ .............................................. G02F 2/00
[52] U.S. Cl. ................................. 370/122; 359/238; 359/173; 359/181; 359/188; 385/1; 385/27; 385/122
[58] Field of Search ............... 359/181, 183, 188, 125, 359/238, 173; 385/1, 2, 3, 27, 122; 370/122

[56] References Cited

U.S. PATENT DOCUMENTS

| | | | |
|---|---|---|---|
| 4,866,698 | 9/1989 | Huggins et al. | 359/181 |
| 5,003,624 | 3/1991 | Terbrack et al. | 359/181 |
| 5,008,957 | 4/1991 | Kiyogo | 359/181 |
| 5,031,235 | 7/1991 | Raskin et al. | 359/125 |
| 5,101,450 | 3/1992 | Olshansky | 359/183 |
| 5,166,821 | 11/1992 | Huber | 359/188 |

Primary Examiner—Melvin Marcelo
Assistant Examiner—Ajit Patel
Attorney, Agent, or Firm—Eli Weiss

[57] ABSTRACT

Optical nonlinear effects, such as stimulated (Brillouin) scattering, cause disproportionate attenuation of transmitted optical signals and usually occurs only when the optical power exceeds a certain level. One of the most important types of nonlinear scattering which occurs in an optical fiber as the power of the optical signal is increased above a certain level is stimulated Brillouin scattering. Brillouin scattering limits the power density of an optical signal that can be injected into an optical fiber. This invention suppresses Brillouin scattering and, by so doing, permits the power density of the optical signal which is injected into an optical fiber to be increased approximately threefold before the Brillouin scattering threshold is reached. More specifically, in a lightwave AM-VSB CATV transmission system having an external modulator, the optical beam which is amplitude modulated with the CATV signals is also phase modulated with a sinusoidal signal having a frequency which is not less than twice the frequency of the highest CATV signal. The phase modulation of the optical beam suppress Brillouin scattering. With this invention the power density of the CATV signal can be increased approximately three fold before the threshold of Brillouin scattering is reached.

16 Claims, 5 Drawing Sheets

SUPPRESSION OF BRILLOUIN SCATTERING IN LIGHTWAVE TRANSMISSION SYSTEM

This is a continuation of application Ser. No. 07/924,690, filed on 07/31/92, now abandoned.

TECHNICAL FIELD

This invention relates to lightwave transmission systems. More particularly, this invention relates to an apparatus for suppressing Brillouin scattering in a single mode optical fiber.

BACKGROUND OF THE INVENTION

At the present time there is a large interest in transmitting cable television signals along an optical fiber lightwave transmission system. The format most commonly used to transmit cable television (CATV) signals along an optical fiber is amplitude modulated vestigial sideband (AM-VSB) where the cable television electrical signal is intensity-modulated onto an optical signal. In practice, severe limitations are normally placed on laser noise and linearity requirements.

External modulation of continuous wave (CW) lasers provides a source which is free of second harmonic distortion, one of the major causes of nonlinearity. CW lasers also have a compact optical spectrum which effectively ameliorates distortion due to fiber chromatic dispersion. Unfortunately, they can enhance the effect of optical nonlinearities, particularly stimulated Brillouin scattering (SBS).

The latter converts the transmitted signal in an optical fiber to a backward scattered signal. Thus, SBS sets a limit on the total amount of optical power that can be injected into an optical fiber.

SUMMARY OF THE INVENTION

This invention is directed towed increasing the total power density of an optical signal that can be injected into an optical fiber before the undesired effect of stimulated Brillouin scattering occurs.

With this invention, stimulated Brillouin scattering, which sets a limit on the total amount of optical power that can be injected into an optical fiber, is suppressed. In one embodiment of the invention, a modulator is arranged for modulating an optical beam with information signals, such as CATV information signals. The modulator includes means for splitting a received optical beam into two separate optical beams. Modulation control signals generated in response to a received information signal, are independently applied to two controllable electrodes that are included in separate waveguide means. In particular, a first and second modulation control signals are applied independently through the separate electrodes to change the relative propagation velocity of each of the two optical beams so that when these two optical beams are combined, they generate an amplitude-modulated optical beam. A third modulation control signal applied to the electrodes also changes the propagation velocity of the two optical beams so that when these two optical beams are combined, they generate a phase-modulated optical beam. The first, second and third modulation control signals are applied to the electrodes such that when the two optical beams are combined, they generate a single optical beam that is simultaneously amplitude- and phase-modulated.

In accordance with the principles of the invention, in an embodiment where a plurality of cable television signals are amplitude modulated with an external modulator such as a Mach-Zehnder interferometer type of modulator, the optical beam which is amplitude modulated with CATV signals is also simultaneously phase modulated with a sinusoidal signal having a frequency which is not less than twice the frequency of the highest CATV signal. The phase modulation suppress Brillouin scattering by changing the optical spectrum from one optical main carrier to three distinctive optical carriers spaced apart by the frequency of the phase modulating signal. The new spectrum enables the power of the input signal to be increased approximately three fold before the stimulated Brillouin scattering threshold is reached.

BRIEF DESCRIPTION OF THE DRAWING

A more complete understanding of the invention can be obtained by reading the following description of a specific illustrative embodiment of the invention in conjunction with the appended drawing in which.

DETAILED DESCRIPTION

Stimulated Brillouin scattering (SBS) is an optical fiber nonlinearity which limits the repeaterless transmission span of a digital lightwave system by placing a limitation on the maximum power that can be injected into an optical fiber. This is because SBS converts the transmitted signal in the optical fiber into a signal propagating in the backward direction toward the transmitter. Normally SBS can be avoided if the total power injected into the optical fiber is kept below 10 mW for a bit rate above several hundred megabits by any modulation format such as, for example, ASK, FSK, PSK.

However, stimulated Brillouin scattering in lightwave amplitude modulated vestigial sideband (AM-VSB) cable television (CATV) systems with external modulation can be a particularly severe limitation.

External modulation of a CW laser with a few percent, i.e., approximately 4% modulation index of multichannel CATV signals has an optical spectrum which is nearly identical to the unmodulated laser. Such an optical spectrum enhances Brillouin scattering and leads to an SBS threshold which is almost identical to that of CW propagation. At the same time, to obtain the typically required 55 dB carrier-to-noise ratio (CNR), the optical power injected into the fiber must be several milliwatts, even for short transmission distances. The consequences from SBS are the limitation of fiber injected power and the addition of excess SBS noise which leads to the degradation of the carder-to-noise ratio.

In this invention there is disclosed an embodiment which increases the Brillouin threshold by about 5 dB. Thus, the carder-m-noise ratio, which is degraded by Brillouin scattering, is significantly improved. More specifically, in this invention, a CATV signal is amplitude-modulated (AM) by an external LiNbO$_3$ Mach-Zehnder interferometer type of modulator, and a sinusoidal signal of at least twice the frequency of the highest CATV signal is imposed on the modulator to simultaneously modulate the phase of the optical field. The phase modulation suppresses Brillouin scattering.

Figure 1:
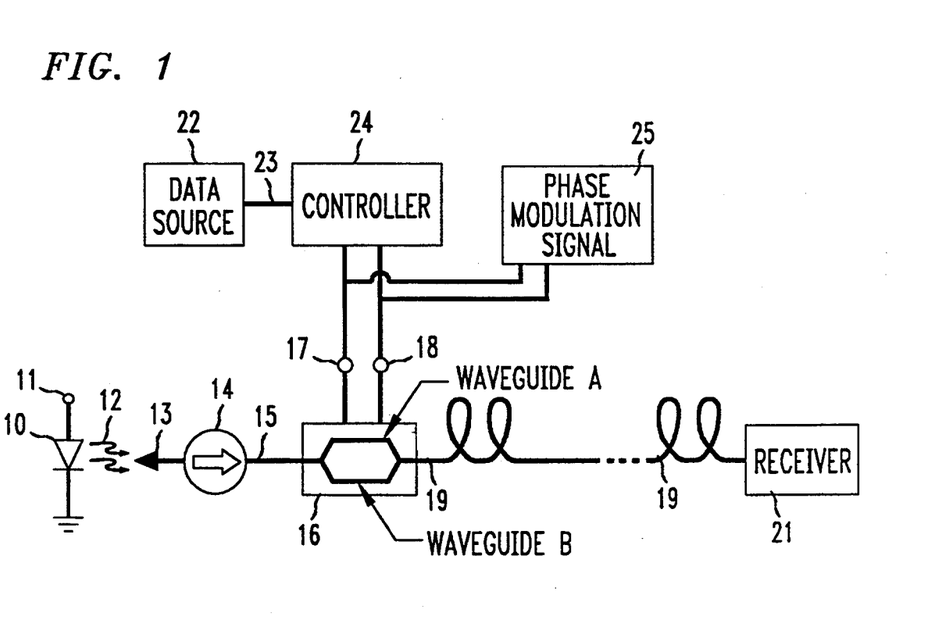
FIG. 1 illustrates a simplified lightwave transmission system including a transmitter realized in accordance with the principles of the invention.

Referring to FIG. 1, there is illustrated a structure in accordance with the principles of the invention for suppressing SBS in a lightwave transmission system by both applying amplitude modulation and phase modulation simultaneously to a regular multichannel CATV signal.

The CATV lightwave transmission system illustrated in FIG. 1 includes a transmitter, a receiver, and a single mode lightwave fiber which connects the transmitter to the receiver. The transmitter includes a laser 10, a lightwave fiber 13, an isolator 14, an external modulator 16, a controller 24, a data source 22, and a source of phase modulation signals 25. The transmission medium is illustrated as a length of optical fiber 19 located between the transmitter and a receiver 21.

In the lightwave transmitter illustrated in FIG. 1, laser 10 generates optical signals 12 at a predetermined transmission wavelength and is operated in either a continuous wave (CW) mode or pulsed mode by applying the appropriate signals to terminal 11 of the laser. For long wavelength systems, laser 10 can be a YAG laser or an InGaAsP/InP semiconductor single mode laser operating nominally at 1.5 $\mu$m. Output optical beam 12 from the laser is coupled into a lensed optical fiber 13 which facilitates coupling the optical beam from the laser to the external modulator.

If desired, an isolator 14 can be positioned between the lensed optical fiber 13 and the external modulator as an in-line element to reduce reflections toward the laser from the downstream portion of the transmission system.

External modulator 16 receives optical signals 12 from the laser via input fiber 15. The external modulator includes two separate waveguides which are independently controllable via controller 24. At the input of the external modulator, optical signals from the laser are coupled into each of the waveguides A and B. At the output of external modulator 16, the modulated optical signals from each waveguide are combined into a single optical signals for transmission over the optical fiber transmission medium. Modulation performed by modulator 16 on optical signals 12 comprises amplitude modulation and phase modulation performed simultaneously.

Controller 24 receives an information signal from data source 22. In the disclosed embodiment, the information signal is 40 channels of AM-VSB CATV signals which are in the frequency band of 52 MHz to 453 MHz. It is understood that the information signal is not limited to AM-VSB CATV signals, but can be digital data signals. Coupled to the output ports of controller 24 is a common mode phase modulation signal from signal source 25. The phase modulation signal is a sinusoidal signal which has a frequency which is not less than twice the highest frequency of the data source.

The phase modulation signals are applied to each of the output ports 17, 18 of the controller. Modulation control signals from controller 24 and phase modulation signals from phase modulator 25 are supplied via output ports 17 and 18 to control the characteristics of waveguides A and B, respectively, of external modulator 16 so that the data from data source 22 is properly modulated onto the amplitude (or intensity or power) of the optical signals at the transmission wavelength in the waveguides, and so that the common mode phase modulation signal simultaneously phase modulates the optical signal. For example, the control signals from the controller 24 and the phase modulating signals adjust the relative propagation velocities of each of the waveguides to permit the data signals to be simultaneously amplitude and phase modulated in accordance with the principles of the invention.

The transmission medium includes at least one length of optical fiber 19 which can be either a standard silica-based fiber having a dispersion minimum in the vicinity of 1.3 $\mu$m or a dispersion shifted fiber having its dispersion minimum in the vicinity of 1.5 $\mu$m. The transmission medium is of sufficient length to span the distance from the transmitter to the lightwave receiver 21.

Lasers, lenses fiber couplers, isolators, polarizers, data sources, external modulators, optical fibers and lightwave receivers are commercially available and known to persons skilled in the art.

Figure 2:
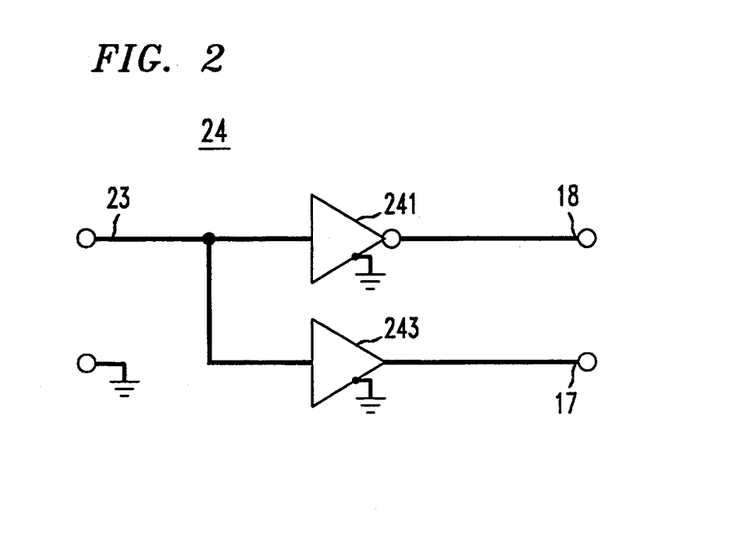
FIG. 2 illustrates a simplified schematic diagram of the controller of FIG. 1.

In an example from experimental practice, a waveguide Mach-Zehnder interferometer (FIG. 3) is used for external modulator 16 and an amplifier arrangement (FIG. 2) is utilized for controller 24. As illustrated in FIG. 2, exemplary controller 24 comprises gain-adjustable amplifiers 241, 243 whose inputs are coupled together to receive the information signal from the data source and the common mode signal at a specific frequency from the source of phase modulating signals 25. Each amplifier can vary the peak-to-peak amplitude swing of the digital data at its output. Amplifier 241 is shown as an inverting amplifier. Such a function is not necessary to the practice of the invention and, therefor, the output amplitude of the signal of amplifier 241 may be zero. Moreover, phase control elements (not illustrated) such as adjustable delay lines are contemplated for use with one or both of the amplifiers, either preceding or following a particular amplifier. Such phase control elements permit the modulation control signal output on lead 17 to have a different phase relative to that of the modulation control signal on lead 18.

Figure 3:
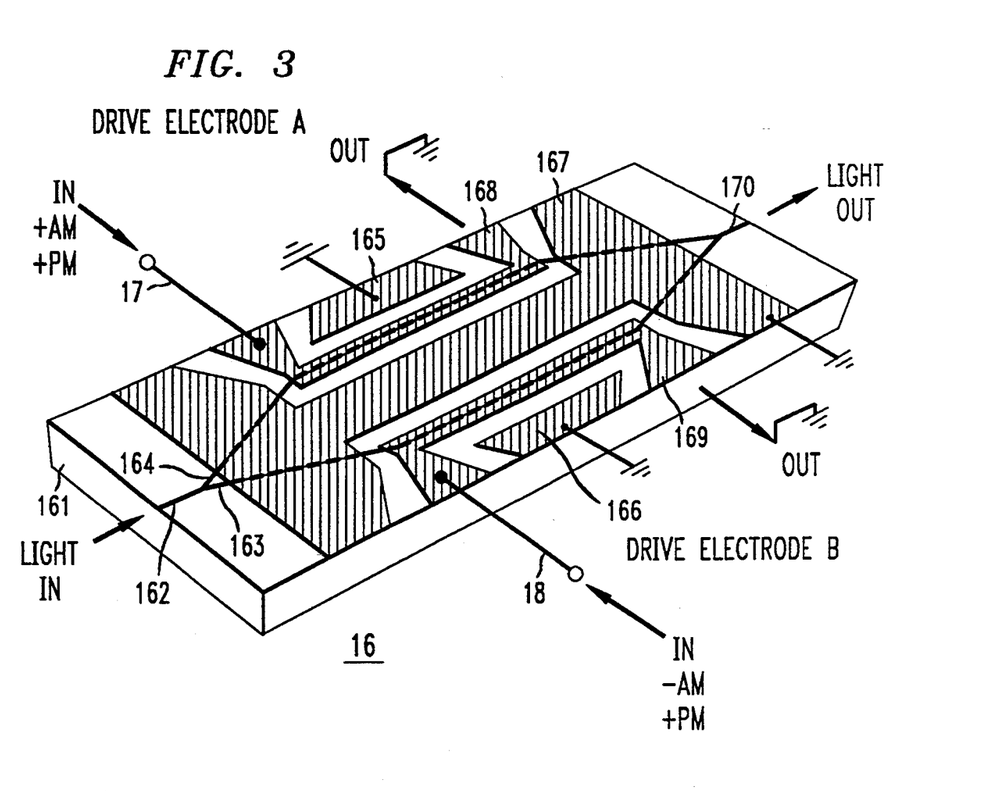
FIG. 3 illustrates a simplified perspective view of an exemplary external modulator for use in the system illustrated in FIG. 1.

Exemplary external modulator 16 shown in FIG. 3 utilizes titanium indiffused waveguides 162, 163, 164 and 170 in a 1×1 Y-branch Mach-Zehnder interferometer configuration on a lithium niobate substrate 161. Ground planes 165, 166 and 167 are disposed to maintain electrical isolation between drive electrodes 168 and 169 and to insure that the drive electrodes control their respective waveguides independent of each other. As a result, waveguides 164 and 163 are individually addressable via drive electrodes 168 and 169, respectively. The drive electrodes are of the traveling-wave or lumped-element type. Drive electrode 168 connected to lead 17 is disposed over a portion of waveguide 164 (waveguide "A") whereas drive electrode 169 connected to lead 18 is disposed over a portion of waveguide 163 (waveguide "B"). In the interferometer waveguide structure, an input Y-branch couples the optical signal in waveguide 162 into both coplanar strip waveguides 163 and 164 while output Y-branch couples the optical signals from coplanar strip waveguides 163 and 164 into a single waveguide 170.

Each optical waveguide is designed using standard techniques for single mode operation at the transmission wavelength (e.g., 1.51 μm). For the external modulator shown in FIG. 3, the waveguides were produced by diffusion of titanium z-cut LiNbO3 so that the two arms of the interferometer are separated by a distance of 250 μm, which is approximately 15 times the gap spacing used between the coplanar waveguide electrodes. The electrodes are formed using standard metallic plating techniques (e.g., gold plating). Although not shown, a silicon dioxide buffer layer is deposited or grown between the waveguides and the corresponding electrodes. Thicknesses of the buffer layer and electrodes, width of the electrodes, and size of the interelectrode gap are selected using standard techniques to realize a modulator having broad bandwidth and low $V_\pi$ where $V_\pi$ is the voltage necessary to achieve a $\pi$-phase shift. For a discussion of design techniques for these types of devices, see *Optical Fiber Telecommunications II*, pp. 421–465 (S. Miller et al. ed. 1988) and S. K. Korotky, *Technical Digest Workshop on Numerical Simulation and Analysis in Guided-Wave Optics and Optoelectronics*, paper SF2 (1988). Impedance of the electrodes 168 and 169 has been measured as approximately 43 Ω where the active length of the electrode is approximately 4 cm. An end-to-end center conductor resistance has been measured as approximately 7.9 Ω.

In order to assure low optical return loss below approximately −60 dB, waveguide ends in external modulator 16 were polished in plane at an angle of 6° from the normal with respect to the waveguide longitudinal axis. Fibers 15 and 19 had their mating end faces polished at the corresponding Fresnel angle of 8° 52'.

In accordance with the invention, an information signal which can consist of 40 channels of AM-VSB CATV signals which are in a frequency band of from 52 MHz to 453 MHz is applied to input port 17 and input port 18 where the signals on the two input ports are equal in amplitude but 180° out of phase; illustrated in FIG. 1 as +AM and −AM. The sinusoidal, fixed frequency common mode phase modulating signal from 25 is applied to input port 17 and input port 18. This signal provides a phase modulation which suppresses Brillouin scattering.

In that instance where the data source signal consists of cable television signals of multiple channels, the frequency of the phase modulation signal should be chosen to be no less than twice that of the highest frequency CATV signal. This insures that there is no interference with the information signal. It is noted that the change in the two branches of the modulator which results from the phase modulation signal does not alter the field's amplitude carrying the information.

For a 40 channel load of AM-VSB CATV signals, the assigned frequency band is 52 MHz to 453 MHz. Thus, in this instance, a common mode signal having a frequency of 990 MHz can be used as the phase modulating signal.

It has been determined that excess noise arising from Brillouin scattering in lightwave AM-VSB CATV systems grows significantly when the fiber injected power is above Brillouin threshold. This noise accompanies the modulated AM-VSB CATV signal in the fiber and degrades the carrier-to-noise (CNR) to some degree more than 10 db. The measured noise power appears to be proportional to the scattered power, i.e.

$$N_{sbs} = \xi P_{scatt}$$

where $\xi$ is a constant that can be determined by measurement.

The total noise power at the receiver is given by $$N_{tot} = N_{th} + N_{shot} + N_{sbs}$$

where $N_{th}$ and $N_{shot}$ are the thermal noise from the receiver and the quantum shot noise respectively.

In a multichannel CATV system, the total noise power is normally dominated by the shot noise. Since the excess noise $N_{sbs}$ is roughly on the same order as the shot noise $N_{shot}$ when the fiber injected power is near the Brillouin threshold, the increase in SBS threshold will lead to the reduction in this excess noise.

Figure 4:
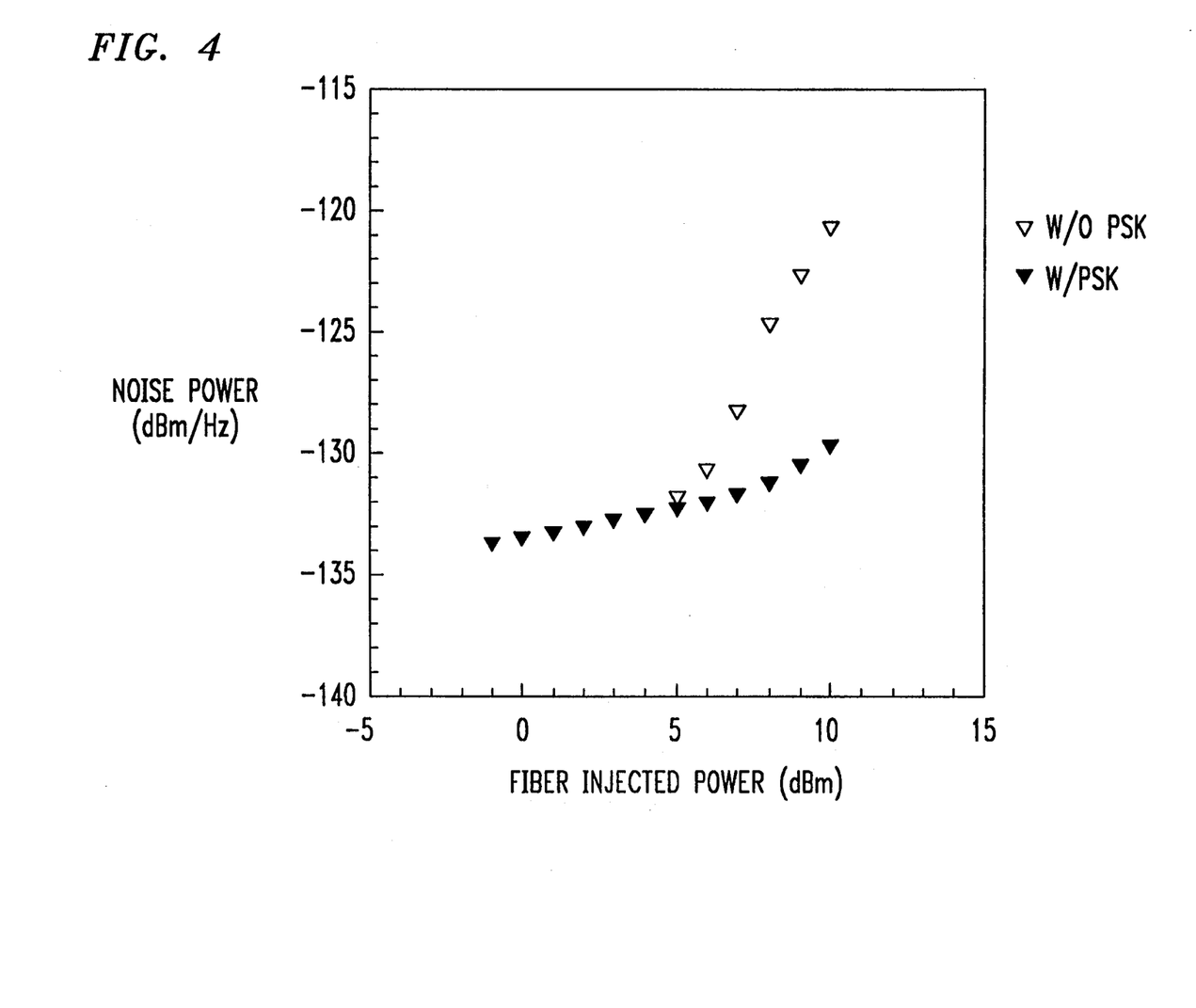
FIG. 4 is a plot of the total noise power versus fiber injected power in a dispersion shifted optical fiber at a signal of 67.25 MHz.

In the invention, it is the phase modulation which suppresses the Brillouin scattering. This phase modulation signal changes the optical spectrum from one optical main carrier to three distinctive optical carders spaced by the frequency of the phase modulating signal. It has been determined that the Brillouin threshold, as determined by one of these three spectral lines of equal amplitude (power) is three times (substantially 5 dB) higher than when phase modulation is not used. FIG. 4 is a plot of the total noise power versus fiber injected power for a single channel frequency of 67.25 MHz. The optical fiber is an AT&T dispersion shifted fiber with a length of 13 km. It is to be noted that with phase modulation, the curve of block triangles, the noise power is almost a straight line and is basically the shot noise.

Figure 5:
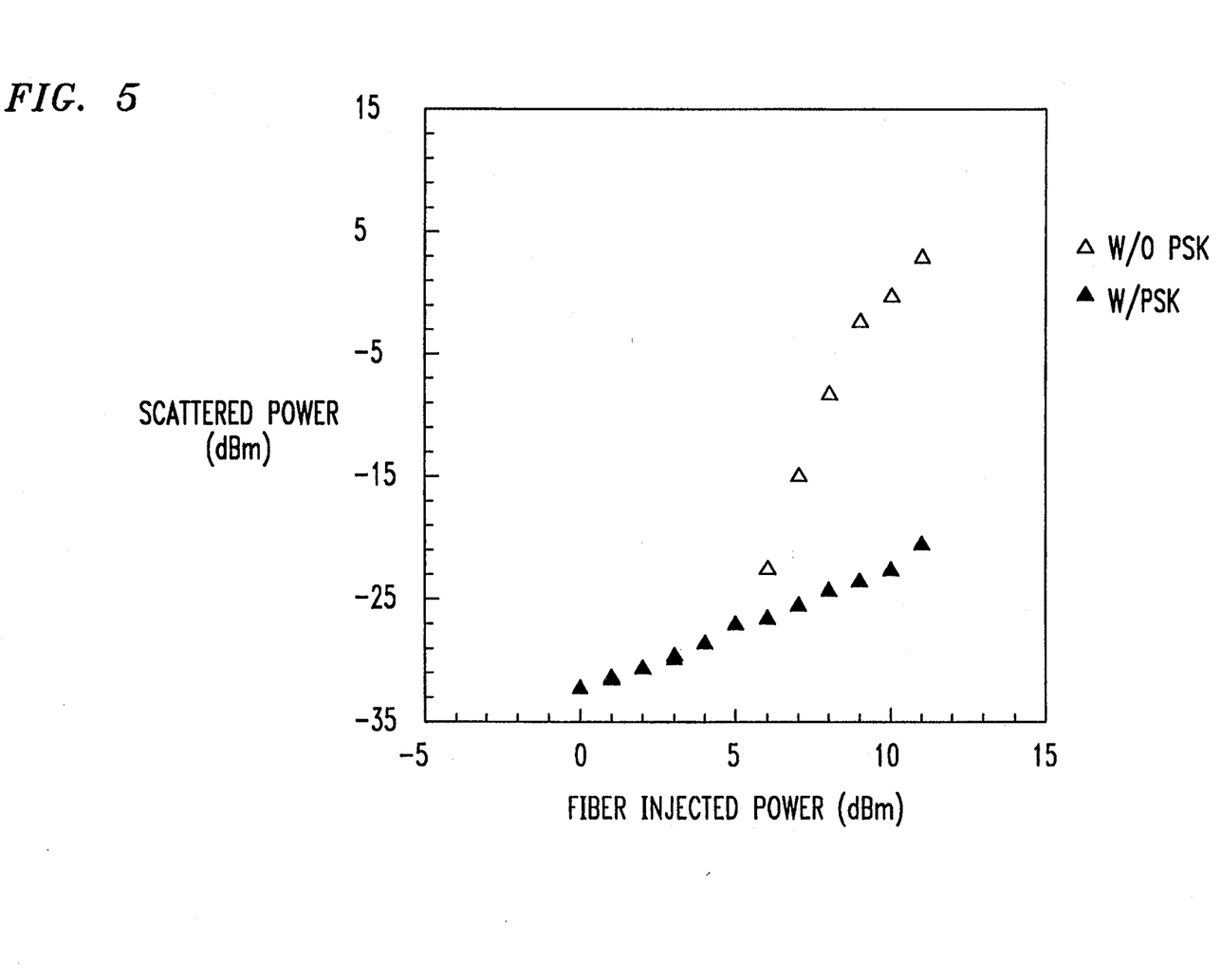
FIG. 5 is a plot of Brillouin scattered power versus fiber injected power of a signal in a dispersion shifter fiber; and, FIG. 6 is a plot of CNR versus fiber injected power of a signal of 67.25 MHz in a dispersion shifted optical fiber.
Figure 6:
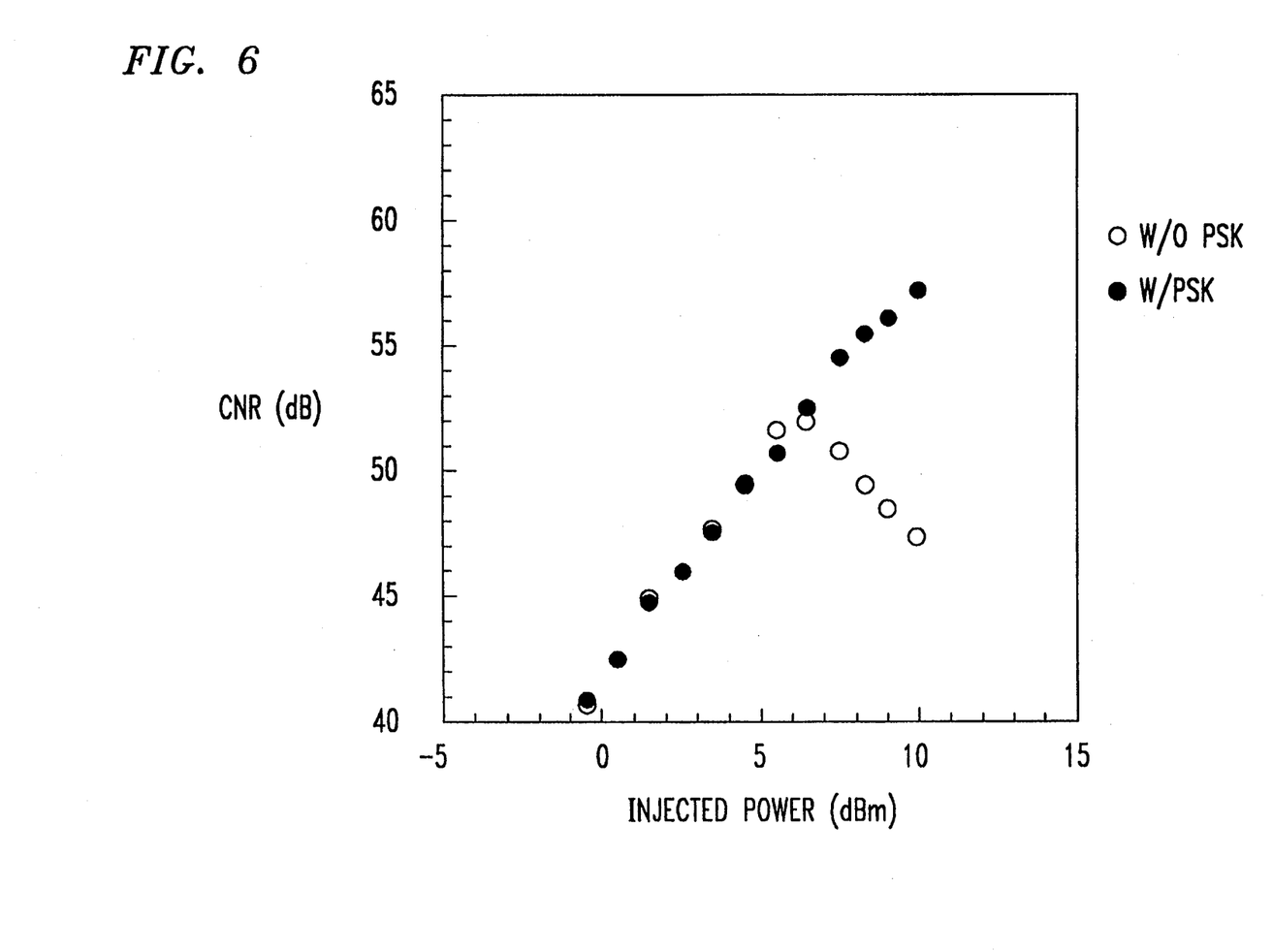

FIG. 5 is a plot of Brillouin scattered power versus fiber injected power where the optical fiber is an AT&T dispersion shifter fiber having a length of 13 km. FIG. 6 is a plot of CNR versus fiber injected power for a channel frequency of 67.25 MHz. The optical fiber is an AT&T dispersion shifted fiber having a length of 13 km.

From FIGS. 4 and 5, the excess noise power is proportional to the Brillouin scattered power. Owing to the increase in the noise power, the carrier-to-noise ratio is degraded as illustrated in FIG. 6.

In accordance with the principles of the invention, there is disclosed the suppression of Brillouin scattering in a lightwave AM-VSB CATV transmission system by amplitude modulating in an external modulator a CATV signal and simultaneously phase modulating the CATV signal with a sinusoidal signal which is not less than twice the frequency of the highest CATV signal.

What has been described is merely illustrative of the application of the principles of the present invention. Other arrangements and methods can be implemented by those skilled in the art without departing from the spirit and scope of the present invention.

We claim:

1. Apparatus for externally modulating an optical beam with art information signal comprising:
   means for splitting a received optical beam into a first and second optical beams;
   first and second optical waveguide means for receiving, respectively, the first and second optical beams, each one of the waveguide means including an electrode means which is a) substantially independent from the electrode means of the other waveguide means, and b) which is used for applying modulation control signals which change the propagation speed of one of the first and second optical beams;

first means responsive to the information signal for generating a first and second modulation control signals which are applied to one or more of the electrodes of the first and second waveguide means, respectively;

second means responsive to the information signal for generating a third modulation control signal which is applied to each of the electrodes of the first and second waveguide means said first and second means being arranged to simultaneously change the propagation speed of both the first and second optical beams; and waveguide output means for combining the first and second optical beams to simultaneously generate a single amplitude- and phase-modulated optical beam.

2. Apparatus for externally modulating an optical beam with information signal according to claim 1 wherein said first modulation control signal is equal in amplitude to said second modulation control signal and 180° out of phase with said second modulation signal.

3. Apparatus for externally modulating an optical beam with information signal according to claim 1 wherein said second modulation control signal has zero amplitude.

4. Apparatus for externally modulating an optical beam with information signal according to claim 2 wherein said third modulation control signal applied to the first waveguide means is in phase with the third modulation control signal applied to the second waveguide means.

5. Apparatus for externally modulating an optical beam with information signal according to claim 4 wherein said third modulation control signal which phase modulates the optical beam has a frequency which is not less than twice the highest frequency of the information signal.

6. Apparatus for externally modulating an optical beam with the information signal according to claim 4 wherein said third modulation control signal comprises broad band noise with an amplitude adjusted to substantially suppress effects of stimulated Brillouin scattering.

7. Apparatus for externally modulating an optical beam with the information signal according to claim 4 wherein said third modulation control signal comprises at least two discrete sinusoidal frequencies which allow the threshold of stimulated Brillouin scattering to be further increased.

8. Apparatus for externally modulating an optical beam with information signal according to claim 5 wherein said information signal is a multichannel AM-VSB CATV signal which lies within a frequency band which extends from 52 MHz to 453 MHz.

9. Apparatus for externally modulating an optical beam with information signal according to claim 5 wherein said information signal comprises digital data.

10. Apparatus for externally modulating an optical beam with information signal according to claim 8 wherein said third modulation control signal for phase modulating the optical beam has a frequency which is not less than 905 MHz.

11. Apparatus for externally modulating an optical beam with information signal according to claim 10 wherein said third modulation control signal for phase modulating the optical beam has a frequency which is not less than 990 MHz.

12. An optical modulator comprising means, responsive to a received optical beam, for generating two optical signals for at least two independently controllable waveguides in the modulator, means responsive to a received information signal for generating at least one amplitude-modulation control signal which is applied to at least one waveguide for changing the propagation speed of the optical signals in said at least one waveguide;

means responsive to a received information signal for generating at least two phase-modulation control signals which are applied to at least two waveguides for phase-modulating the optical signals in each waveguide; and means for combining the optical signals in each waveguide to simultaneously generate a single amplitude-modulated and phase-modulated optical beam.

13. The invention of claim 12 wherein the modulator further comprises at least two electrode means for controlling the at least two waveguides, each waveguide being controlled by one electrode means;

means for applying the at least one amplitude modulation control signal to each of the at least two electrode means with opposite phase of the at least two electrodes; and means for applying the at least two phase modulation control signals with the same phase to the at least two electrodes.

14. The invention of claim 12 wherein the modulator further comprises two electrode means for controlling the at least two waveguides, each waveguide being controlled by one electrode means;

means for applying the at least one amplitude modulation control signal to only one electrode means; and means for applying the at least two phase modulation control signals with the same phase to both electrodes means.

15. The invention of claim 12 wherein said means for generating the at least two phase-modulating control signals further includes means for generating the at least two phase-modulating control signals at a frequency no less than twice the information signal frequency.

16. A method for modulating optical signals comprising the steps of:

in response to receiving an optical beam, generating optical signals for at least two independently controllable waveguides in a modulator;

simultaneously amplitude-modulating and phase-modulating the optical signals with information signals through the generation of a) two types of amplitude-modulation control signals in a controller, each type of said amplitude-modulation control signals being applied to only one waveguide and b) phase-modulation control signals in a phase-modulation signal source for applying said phase-modulation control signals to at least one waveguide; and combining the optical signals from each waveguide into composite output signals.

* * * * *